US007376154B2

(12) United States Patent
Ilnicki et al.

(10) Patent No.: US 7,376,154 B2
(45) Date of Patent: May 20, 2008

(54) NON-INTRUSIVE METHOD FOR ROUTING POLICY DISCOVERY

(75) Inventors: Slawomir K. Ilnicki, Los Altos Hills, CA (US); Lance Tatman, Fremont, CA (US); Alexander L. Tudor, Mountain View, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 905 days.

(21) Appl. No.: 10/652,678

(22) Filed: Aug. 29, 2003

(65) Prior Publication Data

US 2005/0050176 A1 Mar. 3, 2005

(51) Int. Cl.
*H04J 1/02* (2006.01)

(52) U.S. Cl. ...................... 370/488; 370/497

(58) Field of Classification Search ............... 370/229, 370/230, 231, 235, 237, 238, 389, 252, 253, 370/255, 290, 291, 401, 402, 465, 488, 497
See application file for complete search history.

(56) References Cited

U.S. PATENT DOCUMENTS 6,831,890 B1* 12/2004 Goldsack et al. ........... 370/229

7,124,188 B2* 10/2006 Mangipudi et al. ......... 709/226
7,139,242 B2* 11/2006 Bays .......................... 370/238
2003/0133443 A1 7/2003 Klinker et al.

FOREIGN PATENT DOCUMENTS

EP 1 318 629 A2 11/2003

OTHER PUBLICATIONS

C. Villamizar (ANS), R. Chandra (Cisco), R. Govindan (ISI)—"BGP Route Flap Damping", Nov. 1998; RFC 2439, Internet RFC/STD/FYI,BCP Archives; http://www.faqs.org/rfcs/rfc2439.html; pp. 1-30.
Feldmann et al., Title: "deriving Traffic Demands for Operational IP Networks: Methodology And Experience", Computer Communication Review, ACM, New York, NY, US, vol. 30, No. 4, 2000-10, pp. 257-270.
The European Search Report Dated: Oct. 23, 2006.

* cited by examiner

*Primary Examiner*—Brenda Pham

(57) ABSTRACT

Discovering routing policies in information networks. Large networks such as Autonomous Systems are abstracted as a single network element. A plurality of taps on the borders of the abstracted element filter ingress/egress data which is forwarded for collection and correlation. By correlating information from different taps, routing policies are discovered. These discovered policies may be compared with published policies. Access control makes discovered policies and the comparisons with published policies selectively available depending on predefined access classes.

10 Claims, 2 Drawing Sheets

NON-INTRUSIVE METHOD FOR ROUTING POLICY DISCOVERY

FIELD OF THE INVENTION

The present invention relates to digital data networks, and more particularly, to non-intrusive methods for routing policy discovery in networks and/or Autonomous Systems.

ART BACKGROUND

Any digital data traversing a network must be routed. While an end user in California checking a website hosted in the United Kingdom is more concerned about receiving information from that website than how the information travels, the stream of packets representing the user request and the web server response are routed through a number of networks; it is possible that not all the packets involved take the same route.

Routers are specialized computers which forward messages to their respective destinations. One of the tasks of the router is to determine the most effective and/or efficient route for a packet to take. The router switches packets of information between multiple ports connected to other routers and intervening networks.

The intervening networks are constructed as independently administered domains known as Autonomous Systems (AS). Autonomous Systems are comprised of a set of routers and interconnecting paths, but are managed and appear to the outside world as monolithic entities. Packets are routed based on a routing information database. The routing information database within an AS is a result of intra-domain routing protocol processing where the routing information exchanged between ASes is done by intra-domain routing protocols. For inter domain, routing information is typically exchanged using inter-domain routing protocols. Dissemination of inter-domain routing information is a subject of routing policies. These policies have both technical and business aspects.

Technical aspects of routing policies have to do with the most efficient routing of packets. For example, a gigabit link is usually preferred over a T-1 line as it is faster. Routes with fewer hops are usually preferred.

Business aspects of routing policies have to do with cost and business decisions. For example, a business may contract with more than one service provider, routing most of its traffic through one provider and using the second as backup. An AS may base routing on contractual obligations, for example, a contractual obligation to provide a customer with a specified quality of service (QoS) may affect routing policy. An AS uses routing policy to restrict traffic carried on certain high-capacity links to those customers willing to pay a premium for the service. Different ISPs (Internet Service Providers) will apply different routing policies depending with whom they peer.

An ISP or AS should apply its routing policies across all elements of its network, insuring that policies are applied consistently. These routing policies determine, for example, which prefixes are accepted by an AS, from whom, and which prefixes are advertised by the AS, and to whom. Routing policy may also state how prefixes are aggregated, as well as the use of MEDs (Multi-Exit Discriminator) and communities, and the use of damping parameters to control issues such as flapping.

Within an AS the routing information is distributed via intra-domain routing protocols such as the Routing Information Protocol (RIP), Open Shortest Path First Protocol (OSPF), or Intermediate System to Intermediate System (ISIS). Inter-domain routing information is usually distributed via the industry standard Border Gateway Protocol (BGP), or the like. Internally within an AS, BGP exchanges routing information between border routers using iBGP and between ASes using eBGP. Only border routers are involved in BGP routing information exchange. Border routers are those operating on the edges of an AS.

While an AS may appear as a monolithic entity, it is comprised of a myriad of routers and links between those routers. Each router and each link present possible sources of trouble. Trouble may be in the nature of injudicious backhoe operators, faulty connectors, power outages, operator errors, misconfigured routers, or miscommunication between routers. Some of the intra-domain routing changes effect inter-domain routing information.

In a system such as an AS which could be geographically distributed, and contains a myriad of variables such as the operating states of border routers and the links between them, how does the AS operator verify that the routing policies they have put in place have been deployed through the AS and are actually operating? How may an ISP customer verify that his/her ISP is implementing the routing policies for which they have contracted?

Existing solutions monitor BGP and similar exchanges in the target network, gathering routing information at specific locations under the assumption that all border routers of a particular AS behave in the same manner. These solutions suffer from a number of difficulties. First, they can only model the network to the extent of the information received. Even collecting all BGP sessions from all border routers will not guarantee that the disseminated routing information is the same as that reported by the BGP sessions. Extra BGP sessions are required to perform such monitoring, increasing the overhead on monitored routers. Second, prefixes which are blocked will not be visible unless there are also established BGP sessions with other ASes which advertise those prefixes. This means that in order to discover if routes are blocked by a specific border router, a BGP session must be established with a router that advertises the questionable prefixes and with a router which accepts those prefixes. Third, router configuration in the form of BGP sessions or similar information is at least one level removed from the policies being implemented; BGP session data represents the effect or implementation of policy, not the policy itself.

Additionally, data acquired from monitoring BGP sessions describes the network as it is supposed to be, rather than as the network actually is, complete with router misconfigurations, operator errors, faulty equipment, and the myriad of troubles which differentiates the real world from the purity of abstract models.

What is needed is a non-intrusive way to discover routing policies of Autonomous System.

SUMMARY OF THE INVENTION

An AS, or cluster of ASes is abstracted as one routing element. Routing policy in the abstracted element is discovered by collecting information from taps on the edges of the element, filtering the collected information, aggregating the information, and correlating the information. By correlating ingress and egress information collected, deductions may be made on the policies being applied internal to the abstracted element. These discovered policies may be compared to published policies and distributed through an access control mechanism to interested parties with varying levels of detail.

BRIEF DESCRIPTION OF THE DRAWINGS

The present invention is described with respect to particular exemplary embodiments thereof and reference is made to the drawings in which.

DETAILED DESCRIPTION

For inter-domain routing in digital networks which pass traffic which has both source and destination addresses outside themselves, such as in the case of a transit AS, routing is performed with information provided by border routers located on the edges of ASes. Border routers may advertise of withdrawn specific routes. Those border routers obey routing policies that deal with many issues, such as what prefixes to accept and what prefixes to forward.

One routing problem is the colloquially named "route flap," which occurs when a route is unstable; a route is advertised, then withdrawn, then advertised again, perhaps with the same route as before, perhaps with a different route, withdrawn, and so on. Each change in route status nominally requires a change to be propagated to other ASes. The problem with flapping is the large number of route changes which must be communicated to other ASes. Unstable routes and the resulting route-flapping can quickly consume large amounts of resources, mainly CPU, and may also cause problems such as BGP sessions failing, or routers failing. A well known solution to the route-flapping problem is known as BGP route flap damping, described for example in RFC2439 published by The Internet Society.

While RFC2439 specifies algorithms for detecting route flap, and damping algorithms for handling route flap when detected, these algorithms rely on parameters that are policy driven. These policy decisions are important as they affect how quickly route advertisements are propagated through a system.

The present invention, through monitoring selected ingress and egress traffic through an abstracted network element, filtering, aggregating, and correlating the information allows policies internal to the abstracted network element to be discovered. Just by observing or noticing which prefixes appears on the ingress and egress points of an AS does not determine the routing policies. The policy discovery engine must also take under consideration route flapping or route aggregation. By analyzing collected historical data, the routing policy discover engine reasons about which prefixes for example are permanently blocked by an AS and which are not. By analyzing frequency of advertising and withdrawing prefixes, the discovery routing policy engine reasons about how aggressive dampening policy is. In all these discoveries also help to observe the internal BGP (iBGP) routing information dissemination (internal to AS).

Figure 1:
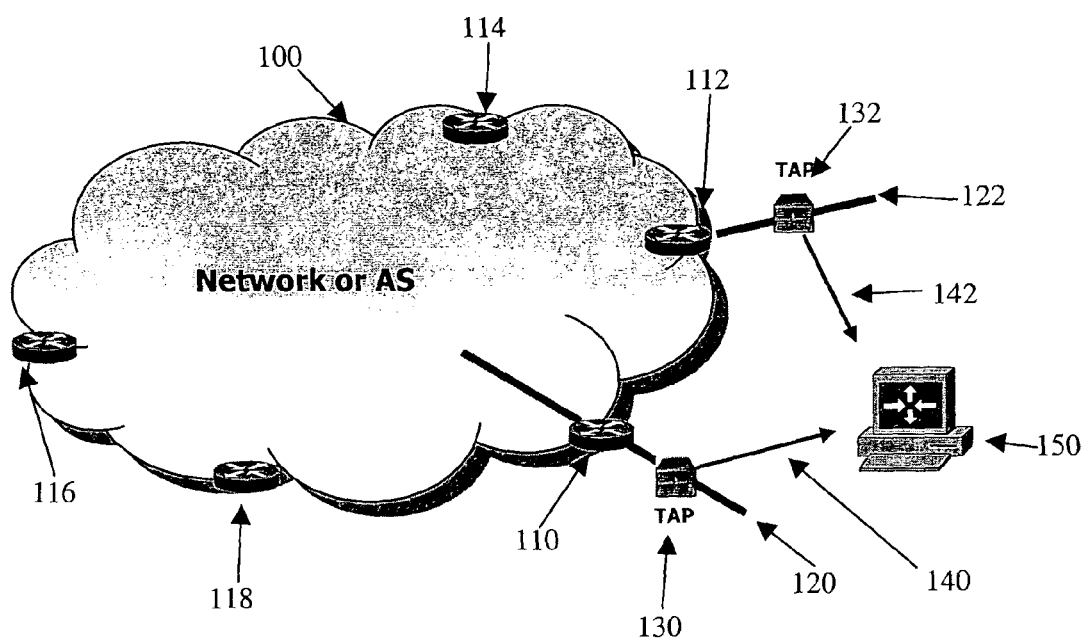
FIG. 1 shows a network with taps and an analysis station.

Referring to FIG. 1, Network 100 has border routers 110, 112, 114, 116, and 118. Network 100 may be a single network, a larger entity such as an Autonomous System (AS), or a cluster of entities such as networks and/or ASes. In accordance with the present invention, network 100 is abstracted as one routing element.

Link 120 to border router 110 has tap 130 which monitors data on link 120. Selected data is sent via link 140 to node 150 for aggregation and analysis. Similarly, link 122 to border router 112 has tap 132 which monitors data on link 122. Selected data is sent via link 142 to node 150. While node 150 is shown connected to taps 130 and 132 via links 140 and 142, node 150 could be anywhere in the network which has communications paths to the taps. For example, node 150 could be another node on link 120, with communications between tap 132 and node 150 running through network 100.

While only two taps 130 and 132 are shown, multiple taps may be used.

Figure 2:
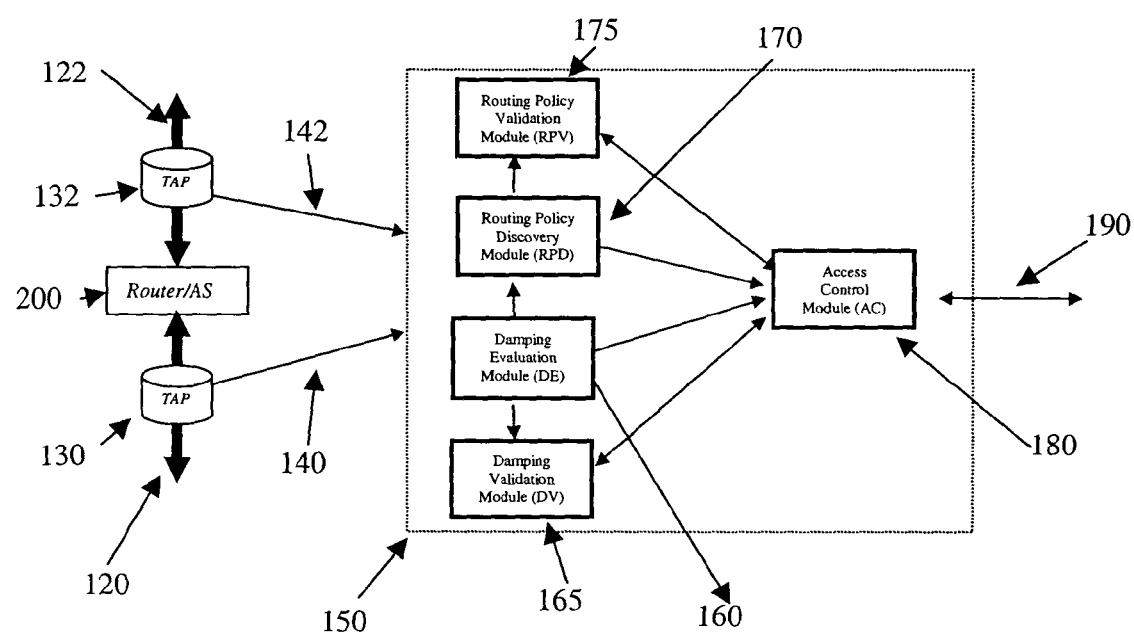
FIG. 2 shows a block diagram including the policy discovery system.

FIG. 2 shows a block diagram including the policy discovery system. Abstracted routing element 200 represents a larger, more complex element such as network 100 of FIG. 1, an Autonomous System, or a network including Autonomous Systems.

In operation, taps 130 and 132 monitor traffic flowing into and out of abstracted routing element 200. Taps 130 and 132 monitor, for example, peering communications sessions flowing into and out of border routers 110 and 112, as well as traffic flowing into and out of the border routers.

While node 150 is shown combining data collection, aggregation, correlation, policy discovery, and policy validation, these steps need not be performed in the same physical location. They may be performed at separate locations on a network, or as separate tasks on a node, depending on the implementation chosen.

Data received from taps 130 and 132 is routed to Routing Policy Discovery (RPD) module 170 and Damping Evaluation (DE) module 160 where it is aggregated and correlated.

RPD module 170 keeps ingress and egress best prefix routes per link and per peer in its tables. If iBGP traffic information is also tapped, then internal best egress and ingress routes are also stored for analysis. iBGP data will provide additional information on how the best routes are selected, because iBGP traffic carries additional attributes such as LocalPref which indicates how external routes should be used. Additionally RPD module 170 keeps per prefix (per peer per link) the last n BGP update messages where n is a configurable parameter. RPD module 170 summarizes this information as discovered routing policy. RPD module 170 deduces routing policies by comparing what prefixes and when were advertised at the ingress points of an AS with prefixes disseminated at the egress points.

DE Module 160 evaluates damping for the entire abstracted network element as well as for individual border routers if iBGP traffic is present. Damping may be evaluated by detecting flapping, repeated advertising and withdrawing of prefixes, at an ingress point of an AS and observing an egress point to observe how the egress router reacts to the flapping. Aggressiveness is measured by how quickly the egress router reacts to flapping. While the algorithms used in damping are well known, such as those specified in RFC 2439, different damping policies may use different parameters. Different prefixes may be damped differently. This requires that DE Module 160 keep historical data on observed flaps and how they are damped on a per-prefix basis. DE Module 160 also feeds evaluated output to RPD module 170 to allow the RPD module to assess which prefixes are blocked intentionally and which are just damped.

Routing Policy Validation (RPV) module 175 accepts user/operator specified routing policy goals and determines if the discovered routing policy from RPD module 170 deviates from those goals. Routing policy goals may include information such as what prefixes are blocked, which are forwarded and to whom, as well as which are aggregated and which are not.

Damping Validation (DV) module 165 similarly compares user/operator specified damping policy goals and determines if the discovered damping policy from DE module 160 deviates from those goals.

Access Control (AC) module 180 allows users to selectively access information. For example, the network operator would like to be able to examine all information such as statistics, discovered policies, and how those policies compare to published policies. Another class of user may be restricted to only accessing the results of the comparison between discovered and published policies. Other users may have access to all information dealing with a range of IP addresses. Access control module 180 checks user privileges of specific prefixes about which the user inquires.

What is claimed is:

1. A method of discovering policies in an abstracted routing element comprising:
    tapping ingress and egress information at a plurality of connections to the element,
    filtering the ingress and egress information at the taps,
    collecting the filtered ingress and egress information from the taps,
    correlating the collected ingress and egress information, and
    discovering policies used in the abstracted routing element from the correlated ingress and egress information, the discovered policies including damping policies that are discovered by i) analyzing the collected ingress information to detect flapping at an ingress point, and ii) analyzing the collected egress information to observe how an egress router reacts to the detected flapping.

2. The method of claim 1 where the abstracted routing element is an Autonomous System.

3. The method of claim 1 where the abstracted routing element is a combination of Autonomous Systems and networks.

4. The method of claim 1 where the policies discovered include routing policies.

5. The method of claim 4 where the routing policies are discovered by comparing prefixes advertised at ingress points with prefixes disseminated at egress points.

6. The method of claim 1 further including the step of:
    comparing discovered policies with predetermined policies.

7. The method of claim 1 further including the step of:
    comparing discovered routing policies with predetermined routing policies.

8. The method of claim 1 further including the step of:
    comparing discovered damping policies with predetermined damping policies.

9. The method of claim 1 further including access control providing limited access to discovered policies based on predetermined access classes.

10. The method of claim 6 further including access control providing limited access to the comparison of discovered policies with predetermined policies based on predetermined access classes.

* * * * *